Oct. 17, 1950     W. THEONVILLE     2,526,298
APPARATUS FOR WEIGHING AND ESTABLISHING
VOLUME OF LOOSE MATERIAL
Filed July 6, 1945
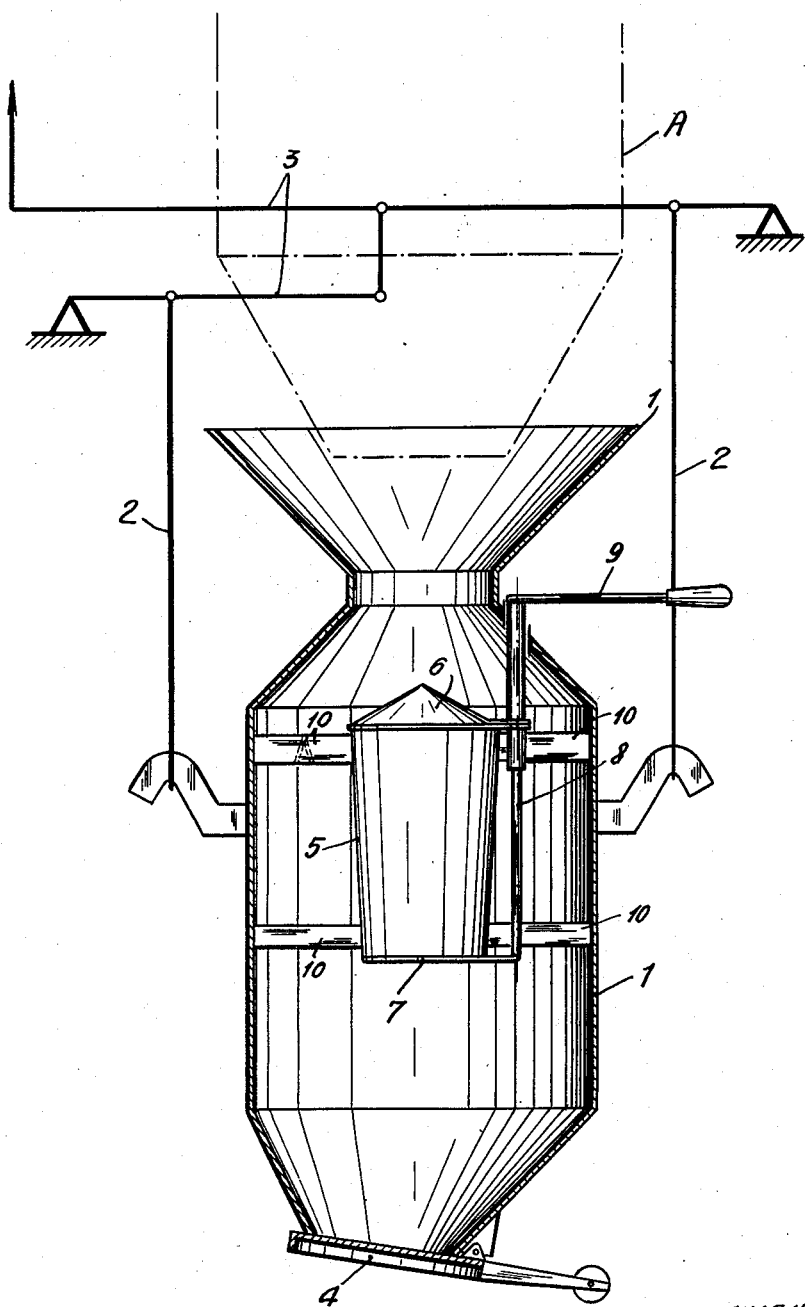
INVENTOR:
W. Theonville
By Bryant & Lowry
attys.

Patented Oct. 17, 1950

2,526,298

UNITED STATES PATENT OFFICE 2,526,298

APPARATUS FOR WEIGHING AND ESTABLISHING VOLUME OF LOOSE MATERIAL

Wilhelmus Théonville, Zurich, Switzerland, assignor to Maatschappij Van Berkel's Patent N. V., Rotterdam, Netherlands, a limited-liability company of the Netherlands Application July 6, 1945, Serial No. 603,561
In Switzerland July 6, 1944

7 Claims. (Cl. 73—32)

To establish the specific and effective weight of granular, flaky and pulverized material devices are used which either ascertain the effective or the specific weight from which the specific weight can be indirectly determined from the actual weight in the former case and in the latter the actual weight from the specific weight. All existing devices for the direct establishing of both the actual and the specific weight are either complicated or impractical owing to their relative bulk.

The present invention relates to an apparatus for weighing and establishing the volume of loose material. According to the invention a weighing container is equipped with means serving to establish the specific weight of the material to be weighed direct. This can be designed in order not to take up more space than one of the usual devices for ascertaining the actual weight.

The drawing shows a schematic embodiment of this invention.

The invention shown is a weighing apparatus with a weighing container 1 suspended on rods 2 engaged to a beam system 3. The latter are connected with a weight indicator not shown in the drawing and a counting device registering the number of weighing operations. The mouth of container 1 is controlled by a closing flap 4. A second container 5 of a given volume is, e. g. concentrically and at a distance, freely suspended in container 1. Its top end is closed by a conical covering slide 6, its bottom end by a flat covering slide 7. Slides 6, 7 are operatively geared by a connecting rod 8. Outside the container 1 a hand lever 9 is engaged with the connecting rod 8 by which slides 6, 7 are forced into the open or closed position. Slides 6, 7 may also be controlled by an electro-magnetic or electro-mechanical drive. The containers 1, 5 are connected by rods 10, said rods being tapered upwards so that no parts of the loose material to be weighed may be deposited on them.

The apparatus described admits of execution of the following weighing operation: In rest the closing flap 4 is shut, slides 6, 7 being open. The loose material to be weighed is filled into the container 1 through the filling sleeve A. As soon as a given weight is attained, the weighing operation is registered on a counting device connected with the indicator, while at the same time the supply for the weight indicator is automatically cut off.

For carrying out a weighing operation and at the same time establishing the specific weight the procedure is as follows: After ascertaining the actual weight of the loose material held in container 1 and constantly open container 5, slides 6, 7 are closed at the same time as closing flap 4 is opened. Thereby the amount of loose material in container 5 is retained while container 1 is emptied. The weight of the material kept in container 5 is given by the weight indicator. Container 5 having an established volume and being necessarily evenly filled, the specific weight can be indicated on a scale graduated according to the volume of the container. Thereupon slides 6, 7 are opened to empty the material through flap 4 which is still open, so that a new weighing process may take place. This establishing of the specific weight is not registered by the counting device, as the material in container 5 was registered in the weighing process prior to the determination of the specific weight.

The beams of the weighing device are specially geared to an automatic weight indicator and a counting device to register the number of weighing operations. The closing appliance formed by slides 6, 7 may be operated electro-mechanically or electro-magnetically. The entire weighing and registering operation can also be made completely automatic by electric contacts. If a counting device is employed for registering the number of weighing operations it is best geared so as to give the total weight in kgs. direct. Slides 6, 7 may be closed, or brought into closing position, in order to establish the specific weight after every weighing process, by a hand-released contact or automatically, instead of manually. The indicator has the advantage of bearing a special scale for direct indication of the specific weight.

The apparatus described is especially suited for weighing and at the same time establishing the specific weight of loose material of every kind, especially of grains, flakes, powder, flour, etc.

What I claim as new and desire to secure by Letters Patent is:

1. Apparatus for weighing loose material and determining directly the specific weight of the material to be weighed and including a weighing container operatively geared to weighing mechanism, a second container of a given volume suspended within and centrally of the weighing container so that the specific weight can be determined by means of said second container by said weighing mechanism, said second container having top and bottom openings and closing devices for said openings adapted to be operated exteriorly of said weighing container.

2. Apparatus for weighing loose material and determining directly the specific weight of the material to be weighed and including a weighing container operatively geared to weighing mechanism, a second container of a given volume suspended within and centrally of the weighing container so that the specific weight can be determined by means of said second container by said weighing mechanism, said second container having top and bottom openings and closing devices for said openings adapted to be operated exteriorly of said weighing container, and operative connections between said closing devices.

3. Apparatus for weighing loose material and determining directly the specific weight of the material to be weighed and including a weighing container operatively geared to weighing mechanism, a second container of a given volume suspended within and centrally of the weighing container so that the specific weight can be determined by means of said second container by said weighing mechanism, said second container having top and bottom openings and closing devices for said openings adapted to be operated exteriorly of said weighing container, the closing device of the upper end of the second container being conical.

4. Apparatus for weighing loose material and determining directly the specific weight of the material to be weighed and including a weighing container operatively geared to weighing mechanism, a second container of a given volume suspended within and centrally of the weighing container so that the specific weight can be determined by means of said second container by said weighing mechanism, said second container having top and bottom openings and closing devices for said openings, and manually operable means exteriorly of said weighing container to operate said closing devices.

5. Apparatus for weighing loose material and determining directly the specific weight of the material to be weighed and including a weighing container operatively geared to weighing mechanism, a second container of a given volume suspended within and centrally of the weighing container so that the specific weight can be determined by means of said second container by said weighing mechanism, said second container having top and bottom openings and closing devices for said openings, manually operable means exteriorly of said weighing container to operate said closing devices, and operative connections between said closing devices.

6. Apparatus for weighing loose material and determining directly the specific weight of the material to be weighed and including a weighing container operatively geared to weighing mechanism, a second container of a given volume suspended within and centrally of the weighing container so that the specific weight can be determined by means of said second container by said weighing mechanism, said second container having top and bottom openings and closing devices for said openings, manually operable means exteriorly of said weighing container to operate said closing devices, the closing device of the upper end of the second container being conical.

7. Apparatus for weighing loose material and determining directly the specific weight of the material to be weighed and including a weighing container operatively geared to weighing mechanism, a second container of a given volume suspended within and centrally of the weighing container so that the specific weight can be determined by means of said second container by said weighing mechanism, said second container having top and bottom openings, closing devices for said openings adapted to be operated exteriorly of said weighing container, rods for supporting the second container in the weighing container and said rods being of inverted V-formation to prevent the accumulation of loose material thereon.

WILHELMUS THÉONVILLE.

REFERENCES CITED

The following references are of record in the file of this patent:

FOREIGN PATENTS

| Number  | Country       | Date           |
|---------|---------------|----------------|
| 191,048 | Switzerland   | Aug. 16, 1937  |
| 444,077 | Great Britain | Mar. 13, 1936  |
| 489,555 | Great Britain | July 28, 1938  |
| 850,941 | France        | Sept. 25, 1939 |